Dec. 9, 1947.  E. ABRAHAMSON  2,432,464
SELF-REVERSING ELECTRIC MOTOR
Filed June 26, 1946  2 Sheets-Sheet 1
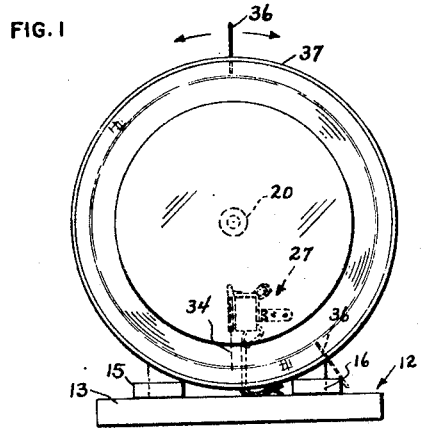
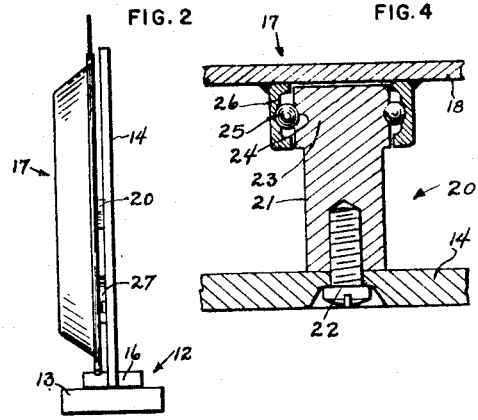
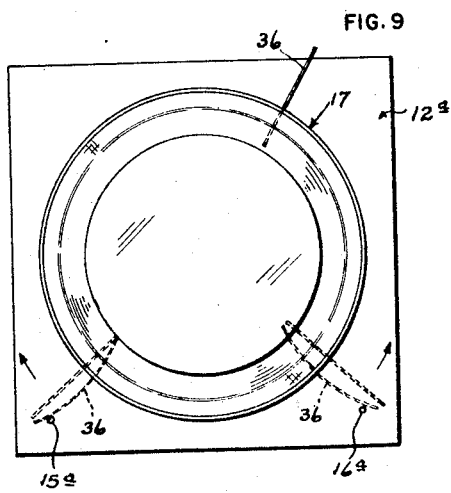
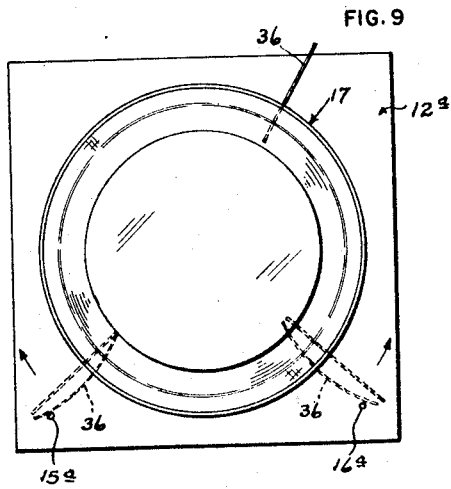
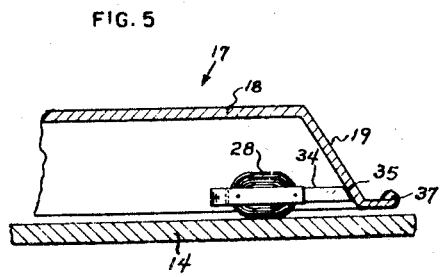
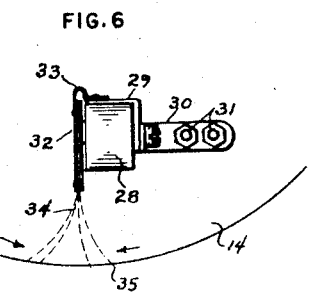
INVENTOR.
EDMUND ABRAHAMSON
BY
PATENT AGENT Dec. 9, 1947.   E. ABRAHAMSON   2,432,464
SELF-REVERSING ELECTRIC MOTOR
Filed June 26, 1946   2 Sheets-Sheet 2
FIG. 10
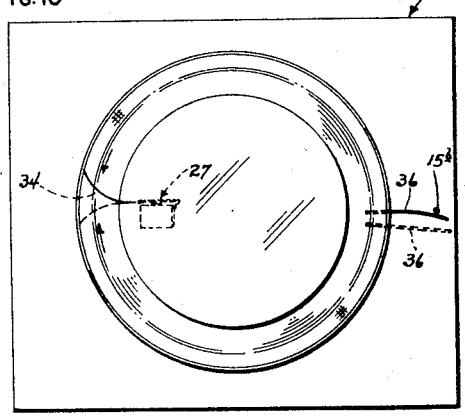
FIG. 11
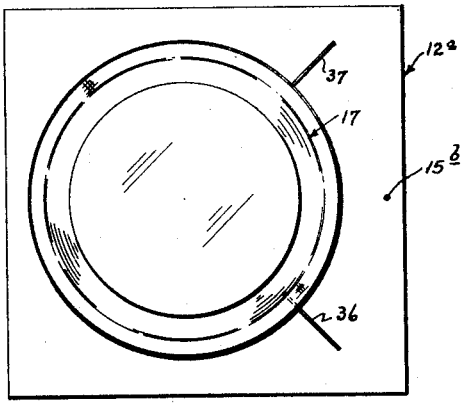
FIG. 7
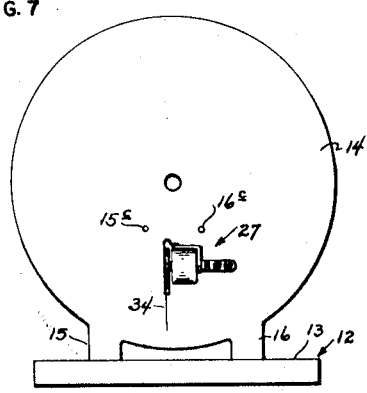
FIG. 8
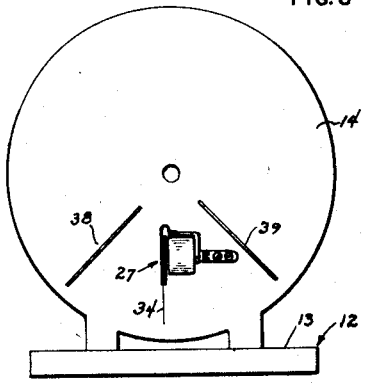
FIG. 7ᵃ
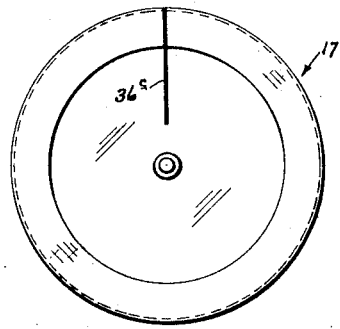
FIG. 8ᵃ
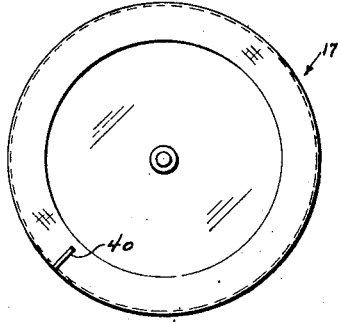
INVENTOR.
EDMUND ABRAHAMSON
BY
PATENT AGENT Patented Dec. 9, 1947

2,432,464

UNITED STATES PATENT OFFICE 2,432,464

SELF-REVERSING ELECTRIC MOTOR

Edmund Abrahamson, Baldwin, N. Y.

Application June 26, 1946, Serial No. 679,338

12 Claims. (Cl. 172—126)

This invention relates to improvements in electro-magnetic motors of the type in which a flexible resilient spring armature is vibrated to intermittently engage a rotary element so as to impart continuing intermittent rotary motion thereto, and the primary object of this invention is to provide a simple and extremely inexpensive self-reversing motor of this class which can be so arranged that the rotary element will be automatically reversed in direction during its operation whenever the rotary element has rotated through a distance of substantially 360° or of any predetermined fractional portion thereof.

Another important object of my invention is to provide an electro-magnetic motor of the character indicated above in which the means for producing reverse rotation of the rotary element comprises one or more flexible resilient spring arms and one or more suitable stationary abutments placed in the path of the spring arm or arms at a predetermined distance or distances from an arbitrary starting point for the rotation of the rotary element, said arms and said abutments being interchangeably mounted on the rotary element or a stationary part of the motor, such as its base, and in such relative relationship that, as the rotary element turns through the predetermined distance from its starting point, said arm or arms will be arrested by engagement with said abutment and deformed or distorted by the impact of the residual turning momentum of the rotary element, until the turning rotary element has been stopped by the resistance offered by the distorted spring arm, whereupon the energy stored in the spring arm by the distortion thereof is immediately released by its resumption of its original undistorted form in such a way as to snap or throw the rotary element in the opposite direction of rotation to sufficiently impart thereto initial rotation in said opposite direction, such as to cause the flexible resilient spring motor armature to snap over from one position of operative engagement with the rotary element to another position of operative engagement therewith, by reason of which rotation of said element in said opposite direction is immediately produced and continued by the operation of said armature until an abutment is again engaged or the motor energizing current is cut off.

Another important object of this invention is to provide a self-reversing motor of the character indicated above which can be so arranged as to automatically rotate alternately in opposite directions upon completion by its rotary element of a complete rotation or of any predetermined fractional portion or portions thereof, so as to establish a predetermined cyclic operation of the motor, in which the periods of rotation of said rotary element in either direction are of substantially fixed duration, thereby rendering the motor suitable and reliable for timing the operation of other devices with which it may be associated, such as electrical switches, advertising displays, game devices, and the like.

Other important objects and advantageous features of this invention will be apparent from the following detailed description and drawings appended thereto, wherein merely for purposes of disclosure herein, non-limitative embodiments of this invention are set forth.

In the drawings:

Figure 1 is a front elevation of one embodiment of this invention with its rotary element or rotor arranged with its axis in a horizontal position, and with a single external spring arm arranged to engage portions on opposite sides of the base for reversing the direction of rotation of the rotor;

Fig. 2 is a side or edge elevation of Fig. 1;

Fig. 3 is a view similar to Fig. 1 with the rotor removed;

Fig. 4 is an enlarged fragmentary section taken through the rotor support bearing usable to all forms of the invention illustrated herein;

Fig. 5 is an enlarged fragmentary transverse section taken through the base and rotor alongside of the vibrator and the resilient spring armature thereof, usable in all forms of the invention illustrated herein;

Fig. 6 is a fragmentary plan or elevation, on enlarged scale, of the vibrator and its resilient armature and showing in dotted lines the oppositely deflected positions which said armature assumes for driving the rotor in opposite directions;

Fig. 7 is a front elevation of a modification of Fig. 1, with the rotor removed, to show a pair of abutments mounted on the base on opposite sides of the vibrator, for engagement by an internal spring arm on the rotor;

Fig. 7ª is a plan view of the rotor used with the modification shown in Fig. 7, showing the internal radially inwardly projecting spring arm.

Fig. 8 is a view similar to Fig. 7, showing another modification of Fig. 1, employing two spring arms mounted on the base within the rotor at opposite sides of the vibrator for engagement with an internal abutment on the rotor;

Fig. 8a is a plan view of the rotor used with the modification shown in Fig. 8, showing the internal radially inwardly projecting abutment;

Fig. 9 is a plan view of another embodiment of the present invention having a horizontal base with the rotor mounted thereon with its axis in a vertical position, and showing employment of a single external radially outwardly projecting spring arm on the rotor, engageable in turn with each of two spaced abutments on the base, and showing in dotted lines the deflection of the spring upon engaging each abutment;

Fig. 10 is a view similar to Fig. 9, showing employment of a single external spring arm on the rotor engageable alternately with opposite sides of a single abutment on the base; and Fig. 11 is a view similar to Fig. 10, showing employment of a pair of spaced external spring arms on the rotor for engaging opposite sides of a single abutment on the base.

Electromagnetic rotors having vibrators having an armature with the free end thereof engageable intermittently with a surface of a rotor for turning a rotor at a substantially constant speed in one direction only are known in the art. However, the known vibrator operated motors do not include any means for reversing the direction of rotation of their rotors, either at the end of a complete or 360° rotation, or at the end of any fraction of a rotation, and their rotors continue to turn in the one direction as long as the current supply to the vibrator is maintained or until some greater force is applied to the rotor to arrest its rotation.

Further, the armatures of the prior art vibrator motors are either too stiff and inflexible or are otherwise not devised to permit them to be snapped over or flexed from the angle at which they initially engage the rotor surface for pushing the rotor around in one established direction, to an oppositely angulated position so that the rotor will be pushed around in the opposite direction, and no means is shown in the prior art for causing the armature to snap over from one such angular position to the opposite angular position to cause reversing of the direction of rotation of the rotor, either selectively at the will of the operator, or automatically without attention from the operator.

Hence, it is apparent that applicant is the first to provide and devise reversing means in motors of the type to which the present invention relates, and that in the provision of such reversing means modification of the armatures of such motors has had to be devised by applicant to provide them with sufficient resilience and flexibility to cooperate effectively with relatively stationary abutments, so that there can take place the shifting from one side to the other, with respect to the armature, of the angle of engagement with the rotor of the free end of the armature required for reverse operation of the rotor.

The present invention may be carried out in various ways, besides those illustrated herein, it being understood, for instance, that the arrangements of the present invention apply equally where the vibrator armature engages a surface of the rotor other than the peripheral wall thereof, as shown in the embodiments of the invention and modifications thereof, shown and described herein merely to satisfy the requirements for disclosure. Further, the free ends of the armatures need not be the terminal ends of the flat springs cut off at an angle, as shown herein, but these terminal ends may assume any practicable form capable of turning the rotor when vibrated in contact therewith.

Referring in detail to the various embodiments of the invention illustrated herein, and first to that shown in Figs. 1 to 6 and 7, 7ª and 8 and 8ª of the drawings, characterized by an upright base and a rotor mounted thereon with its axis in a horizontal position, the numeral 12 generally designates the base which comprises a horizontal plate 13 to rest upon any desired supporting surface, and an upright relatively thin circular plate 14 mounted edgewise on the plate 13 between blocks 15 and 16.

The rotor 17, which may assume various other circular forms, comprises a pan-shaped element including the plane disk part 18 and the angulated peripheral wall part or flange 19, and may be made of any suitable material, such as metal and plastics or a combination thereof.

The rotor is supported on the base in all forms of the invention herein by means of a suitable friction reducing bearing 20, in this instance comprising, as shown in Fig. 4, a stub shaft 21 fixed to the base plate 14 by a stud 22 passing therethrough and threaded in the adjacent end of the stubshaft, having an enlarged head 23 provided with a ball race 24 in which ball bearings 25 are confined by a shell 26 surrounding said head and fixed to the inner side of the plane disk part 18 of the rotor at the center thereof. By this means the rotor is freely revolubly supported on the base, with the edge of the rotor flange 19 closely spaced from the base plate 14, as shown in Fig. 5.

The electro-magnetic vibrator 27 comprises, as best shown in Fig. 6, a magnet coil 28 supported by a frame 29 having a bracket 30 secured by screws or the like 31 to the base plate 14, so that the vibrator as a whole is mounted on the lower center portion of said base plate 14. An armature 32 has one end connected by a spring 33 to the frame 29 and extends across the core of the magnet coil, and the opposite end of the armature terminates in a flat, relatively thin, normally straight spring 34, which in this case extends toward the rotor flange 19 in a direction which is coincident with or substantially parallel to but displaced slightly toward one side of a radius of the rotor which is perpendicular to the plane of the horizontal plate part 13 of the base.

The armature spring 34 is of such a length that in engaging the flange 19 of the rotor it is forced to assume a slightly compressed or bowed condition, as shown in Fig. 6, so that the free end or tip 35 thereof is angulated sufficiently toward either side to determine the direction in which the tip comes into engagement with the rotor flange and consequently the direction in which the vibration of the armature spring will turn the rotor 17. As hereinabove pointed out, instead of being relatively rigid or otherwise not devised to be snapped over from one bowed position to the opposite bowed position, as is the case with the armatures of prior vibrator motors of this class, the armature spring 34 of the present invention is specially devised for its flexibility and resilience, so that it effectively assumes the opposed positions, and when in either of such positions is sufficiently tensioned against the rotor flange 19 to remain in such position until snapped over to the opposite position by means hereinafter described in detail.

The armature spring tip 35 is angulated, as indicated in Fig. 5, so as to substantially conformably engage the beveled inner surface of the flange 19 of the rotor 17, but this is not essential, since any operative engagement of the tip 35 with the rotor flange or other suitable part of the rotor will suffice.

The rotor reversing means comprises means for producing snap-over of the armature spring 34 from one bowed position to an oppositely bowed position of engagement with the rotor 17, consisting of a generally cooperative arrangement of resilient cushion and stationary abutment for engagement thereby in the course of rotation of the rotor, such that upon the cushion striking the abutment the momentum of the rotor can distort or compress the cushion and halt the rotor, so that the resultant and immediately consequent rebound of the cushion can throw the rotor 17 sufficiently far in the reverse direction to cause the armature spring 34 to snap over to its opposite bowed position without interruption of the vibration thereof or of the energization of the vibrator 27, so that the rotor will be immediately turned in the reverse or opposite direction by the continued vibration of the armature spring 34 in its new position.

In the embodiment shown in Fig. 1, the cushion of said reversing means comprises a single flexible and resilient reversing arm 36 which is fixed to the rim 37 of the rotor flange 19, being secured thereto in any suitable manner, to extend radially outwardly therefrom far enough to engage the abutment means, which in this instance consists of the blocks 15 and 16 on the opposite sides of the base. As the rotor 17 turns in a counter-clockwise direction, the arm 36 will strike the block 15 and thereby distort the arm 36 so that the rotor is stopped and then turned in the opposite direction, at the same time that the armature spring 34 is snapped over so that it is bowed to the opposite side and in vibrating turns the rotor in the clockwise direction. Similarly, when in turning in the clockwise direction the rotor 17 carries the reversing arm 36 into engagement with the block 16, the direction of rotation of the rotor 17 is immediately reversed. The alternate rotation of the rotor in the arc subtended by the blocks 15 and 16 continues as long as the vibrator 27 is operated.

In the form of the invention shown in Figs. 9, 10 and 11, the rotor 17 and vibrator 27 are the same as above described, but the rotor 17 is mounted with its axis vertical on a generally horizontal base 12ª.

In Fig. 9 the base 12ª has abutments in the form of pegs 15ª and 16ª spaced from each other at a distance which is a desired fraction of the total circumference of 360°, against which the reversing arm 36 can alternately engage for reversing the rotor 17.

In Fig. 10 only a single post 15ᵇ is provided, alternate sides of which the reversing arm 36 engages to provide reverse rotation of the rotor 17 through substantially 360°.

In the form of the invention shown in Fig. 11, the base 12ª has only a single abutment post 15ᵇ, but the rotor 17 has two predetermined spaced reversing arms 36 and 37, arranged to alternately engage opposite sides of the post 15ᵇ.

The above described forms of the invention all employ reversing arms and abutments arranged externally of the rotor, but the forms shown in Figs. 7, 7ª, 8 and 8ª have internal reversing arms and abutments.

In Figs. 7 and 7ª the plate 14 of the base 12 has two desirably spaced posts 15ᶜ and 16ᶜ arranged near the vibrator 27, while the rotor has a flexible and resilient reversing arm 36ᶜ fixed to project radially inwardly from the flange 19 of the rotor 17 into the path of the posts, so that the arm 36ᶜ will alternately engage the posts 15ᶜ and 16ᶜ and the rotor 17 will be reversed thereby.

The form of the invention shown in Figs. 8 and 8ª has two spaced radially outwardly extending resilient reversing arms 38 and 39 fixed on the base plate 14 near the center thereof in the path of an abutment arm 40 fixed to project radially inwardly from the flange 19 of the rotor 17, so that as the rotor is rotated by the vibrator 27, the abutment 40 will alternately engage the arms 38 and 39 and the rotor will be thereby reversed in direction.

It will be evident to those skilled in related arts that other structural arrangements and combinations thereof can be employed or devised to embody the invention disclosed herein, and that it is intended that the present invention include all such, without limitation to the specific forms thereof herein set forth.

What I claim is:

1. In a vibrator motor, a relatively stationary base, a rotor revolubly mounted thereon, and an electromagnetic vibrator on said base having an armature comprising an arm intermittently engageable with an annular portion of said rotor as said vibrator is operated whereby said rotor is continuously turned in one direction, rotor reversing means comprising a resilient cushion means, and abutment means optionally mounted on said base and rotor, said cushion means and abutment means being arranged to engage as said rotor rotates in said direction whereby said cushion means is distorted until the rotor is halted and said cushion means can react so as to push the rotor in the opposite direction of rotation, to be continued in said opposite direction of rotation by the action of said armature arm on said annular portion of said rotor.

2. In a vibrator motor, a relatively stationary base, a rotor revolubly mounted thereon, an electromagnetic vibrator having an armature comprising a spring arm arranged with its free end engaged with an annular portion on said rotor, said spring arm being of such length that it is bowed to one side of its longitudinal axis when its free end is engaged with said annular portion of said rotor and said spring arm is vibrated by operation of said vibrator so as to turn said rotor in one direction, resilient cushion means and abutment means optionally mounted on said rotor and said base in position to engage during the rotation of said rotor relative to said base, the engagement of said cushion means and abutment means with each other operating to distort said cushion means until the rotation of said rotor in said direction is halted and said cushion means can react to push said rotor in the opposite direction of rotation and substantially simultaneously reverse said spring arm so that said spring arm bows toward the opposite side of its longitudinal axis and turns said rotor in the opposite direction of rotation.

3. In a vibrator motor, a relatively stationary base, a rotor revolubly mounted thereon, an electromagentic vibrator having an armature comprising a spring arm arranged with its free end engaged with an annular portion on said rotor, said spring arm being of such length that it is bowed to one side of its longitudinal axis when its free end is engaged with said annular portion of said rotor and said spring arm is vibrated by operation of said vibrator so as to turn said rotor in one direction, resilient cushion means and abutment means optionally mounted on said rotor and said base in position to engage during the rotation of said rotor relative to said base, the engagement of said cushion means and abutment means with each other operating to distort said cushion means until the rotation of said rotor in said direction is halted and said cushion means can react to push said rotor in the opposite direction of rotation and substantially simultaneously reverse said spring arm so that said spring arm bows toward the opposite side of its longitudinal axis and turns said rotor in the opposite direction of rotation, said cushion means comprising resilient reversing arm means and said abutment means comprising relatively rigid post means.

4. In a vibrator motor, a relatively stationary base, a rotor revolubly mounted thereon, an electromagnetic vibrator having an armature comprising a spring arm arranged with its free end engaged with an annular portion on said rotor, said spring arm being of such length that it is bowed to one side of its longitudinal axis when its free end is engaged with said annular portion of said rotor and said spring arm is vibrated by operation of said vibrator so as to turn said rotor in one direction, resilient cushion means and abutment means optionally mounted on said rotor and said base in position to engage during the rotation of said rotor relative to said base, the engagement of said cushion means and abutment means with each other operating to distort said cushion means until the rotation of said rotor in said direction is halted and said cushion means can react to push said rotor in the opposite direction of rotation and substantially simultaneously reverse said spring arm so that said spring arm bows toward the opposite side of its longitudinal axis and turns said rotor in the opposite direction of rotation, said cushion means comprising resilient reversing arm means and said abutment means comprising relatively rigid post means mounted on said base and said rotor, respectively.

5. In a vibrator motor, a relatively stationary base, a rotor revolubly mounted thereon, an electromagnetic vibrator having an armature comprising a spring arm arranged with its free end engaged with an annular portion on said rotor, said spring arm being of such length that it is bowed to one side of its longitudinal axis when its free end is engaged with said annular portion of said rotor and said spring arm is vibrated by operation of said vibrator so as to turn said rotor in one direction, resilient cushion means and abutment means optionally mounted on said rotor and said base in position to engage during the rotation of said rotor relative to said base, the engagement of said cushion means and abutment means with each other operating to distort said cushion means until the rotation of said rotor in said direction is halted and said cushion means can react to push said rotor in the opposite direction of rotation and substantially simultaneously reverse said spring arm so that said spring arm bows toward the opposite side of its longitudinal axis and turns said rotor in the opposite direction of rotation, said cushion means comprising resilient reversing arm means and said abutment means comprising relatively rigid post means mounted on said rotor and said base, respectively.

6. In a vibrator motor, a relatively stationary base, a rotor revolubly mounted thereon, an electromagnetic vibrator having an armature comprising a spring arm arranged with its free end engaged with an annular portion on said rotor, said spring arm being of such length that it is bowed to one side of its longitudinal axis when its free end is engaged with said annular portion of said rotor and said spring arm is vibrated by operation of said vibrator so as to turn said rotor in one direction, resilient cushion means and abutment means optionally mounted on said rotor and said base in position to engage during the rotation of said rotor relative to said base, the engagement of said cushion means and abutment means with each other operating to distort said cushion means until the rotation of said rotor in said direction is halted and said cushion means can react to push said rotor in the opposite direction of rotation and substantially simultaneously reverse said spring arm so that said spring arm bows toward the opposite side of its longitudinal axis and turns said rotor in the opposite direction of rotation, said cushion means comprising resilient reversing arm means and said abutment means comprising relatively rigid post means mounted on said rotor and said base, respectively, said resilient reversing arm means comprising a single radially projecting arm.

7. In a vibrator motor, a relatively stationary base, a rotor revolubly mounted thereon, an electromagnetic vibrator having an armature comprising a spring arm arranged with its free end engaged with an annular portion on said rotor, said spring arm being of such length that it is bowed to one side of its longitudinal axis when its free end is engaged with said annular portion of said rotor and said spring arm is vibrated by operation of said vibrator so as to turn said rotor in one direction, resilient cushion means and abutment means optionally mounted on said rotor and said base in position to engage during the rotation of said rotor relative to said base, the engagement of said cushion means and abutment means with each other operating to distort said cushion means until the rotation of said rotor in said direction is halted and said cushion means can react to push said rotor in the opposite direction of rotation and substantially simultaneously reverse said spring arm so that said spring arm bows toward the opposite side of its longitudinal axis and turns said rotor in the opposite direction of rotation, said cushion means comprising resilient reversing arm means and said abutment means comprising relatively rigid post means mounted on said rotor and said base, respectively, said resilient reversing arm means comprising a pair of spaced radially projecting arms.

8. In a vibrator motor, a relatively stationary base, a rotor revolubly mounted thereon, an electromagnetic vibrator having an armature comprising a spring arm arranged with its free end engaged with an annular portion on said rotor, said spring arm being of such length that it is bowed to one side of its longitudinal axis when its free end is engaged with said annular portion of said rotor and said spring arm is vibrated by operation of said vibrator so as to turn said rotor in one direction, resilient cushion means and abutment means optionally mounted on said rotor and said base in position to engage during the rotation of said rotor relative to said base, the engagement of said cushion means and abutment means with each other operating to distort said cushion means until the rotation of said rotor in said direction is halted and said cushion means con react to push said rotor in the opposite direction of rotation and substantially simultaneously reverse said spring arm so that said spring arm bows toward the opposite side of its longitudinal axis and turns said rotor in the opposite direction of rotation, said cushion means comprising resilient reversing arm means and said abutment means comprising relatively rigid post means mounted on said base and said rotor, respectively, said abutment means comprising a single stationary post.

9. In a vibrator motor, a relatively stationary base, a rotor revolubly mounted thereon, an electromagnetic vibrator having an armature comprising a spring arm arranged with its free end engaged with an annular portion on said rotor, said spring arm being of such length that it is bowed to one side of its longitudinal axis when its free end is engaged with said annular portion of said rotor and said spring arm is vibrated by operation of said vibrator so as to turn said rotor in one direction, resilient cushion means and abutment means optionally mounted on said rotor and said base in position to engage during the rotation of said rotor relative to said base, the engagement of said cushion means and abutment means with each other operating to distort said cushion means until the rotation of said rotor in said direction is halted and said cushion means can react to push said rotor in the opposite direction of rotation and substantially simultaneously reverse said spring arm so that said spring arm bows toward the opposite side of its longitudinal axis and turns said rotor in the opposite direction of rotation, said cushion means comprising resilient reversing arm means and said abutment means comprising relatively rigid post means mounted on said base and said rotor, respectively, said abutment means comprising a pair of spaced stationary posts.

10. In a vibrator motor, a relatively stationary base, a rotor revolubly mounted thereon, an electromagnetic vibrator having an armature comprising a spring arm arranged with its free end engaged with an annular portion on said rotor, said spring arm being of such length that it is bowed to one side of its longitudinal axis when its free end is engaged with said annular portion of said rotor and said spring arm is vibrated by operation of said vibrator so as to turn said rotor in one direction, resilient cushion means and abutment means optionally mounted on said rotor and said base in position to engage during the rotation of said rotor relative to said base, the engagement of said cushion means and abutment means with each other operating to distort said cushion means until the rotation of said rotor in said direction is halted and said cushion means can react to push said rotor in the opposite direction of rotation and substantially simultaneously reverse said spring arm so that said spring arm bows toward the opposite side of its longitudinal axis and turns said rotor in the opposite direction of rotation, said cushion means comprising resilient reversing arm means and said abutment means comprising relatively rigid post means mounted on said rotor and said base, respectively, with said resilient reversing arm means projecting radially outwardly from said rotor, and said abutment means being positioned on said base at the side of said rotor.

11. In a vibrator motor, a relatively stationary base, a rotor revolubly mounted thereon, an electromagnetic vibrator having an armature comprising a spring arm arranged with its free end engaged with an annular portion on said rotor, said spring arm being of such length that it is bowed to one side of its longitudinal axis when its free end is engaged with said annular portion of said rotor and said spring arm is vibrated by operation of said vibrator so as to turn said rotor in one direction, resilient cushion means and abutment means optionally mounted on said rotor and said base in position to engage during the rotation of said rotor relative to said base, the engagement of said cushion means and abutment means with each other operating to distort said cushion means until the rotation of said rotor in said direction is halted and said cushion means can react to push said rotor in the opposite direction of rotation and substantialy simultaneously reverse said spring arm so that said spring arm bows toward the opposite side of its longitudinal axis and turns said rotor in the opposite direction of rotation, said cushion means comprising resilient reversing arm means and said abutment means comprising relatively rigid post means mounted on said base and said rotor, respectively, with said resilient reversing arm means projecting radially inwardly from the perimeter of said rotor and said abutment means being positioned on said base within the perimeter of said rotor.

12. In a vibrator motor comprising a relatively stationary base, a rotor revolubly mounted thereon, and an electromagnetic vibrator on said base having an armature including an arm alternately engageable with an annular portion of said rotor as said armature is vibrated whereby said rotor is rotated in one direction, the improvement of rotor reversing means comprising a resilient reversing arm and a relatively stationary abutment positioned in the path of said reversing arm so that said reversing arm and abutment will engage as said rotor rotates relative to said base, and said reversing arm will be distorted until the rotation of said rotor is halted and will then react so as to push said rotor in the opposite direction of rotation continued therein by the action of said armature arm.

EDMUND ABRAHAMSON.